April 15, 1941.                C. M. McCARTHY                2,238,067
                       ROPE WINDING AND MEASURING MACHINE
                           Filed May 31, 1938            3 Sheets-Sheet 2
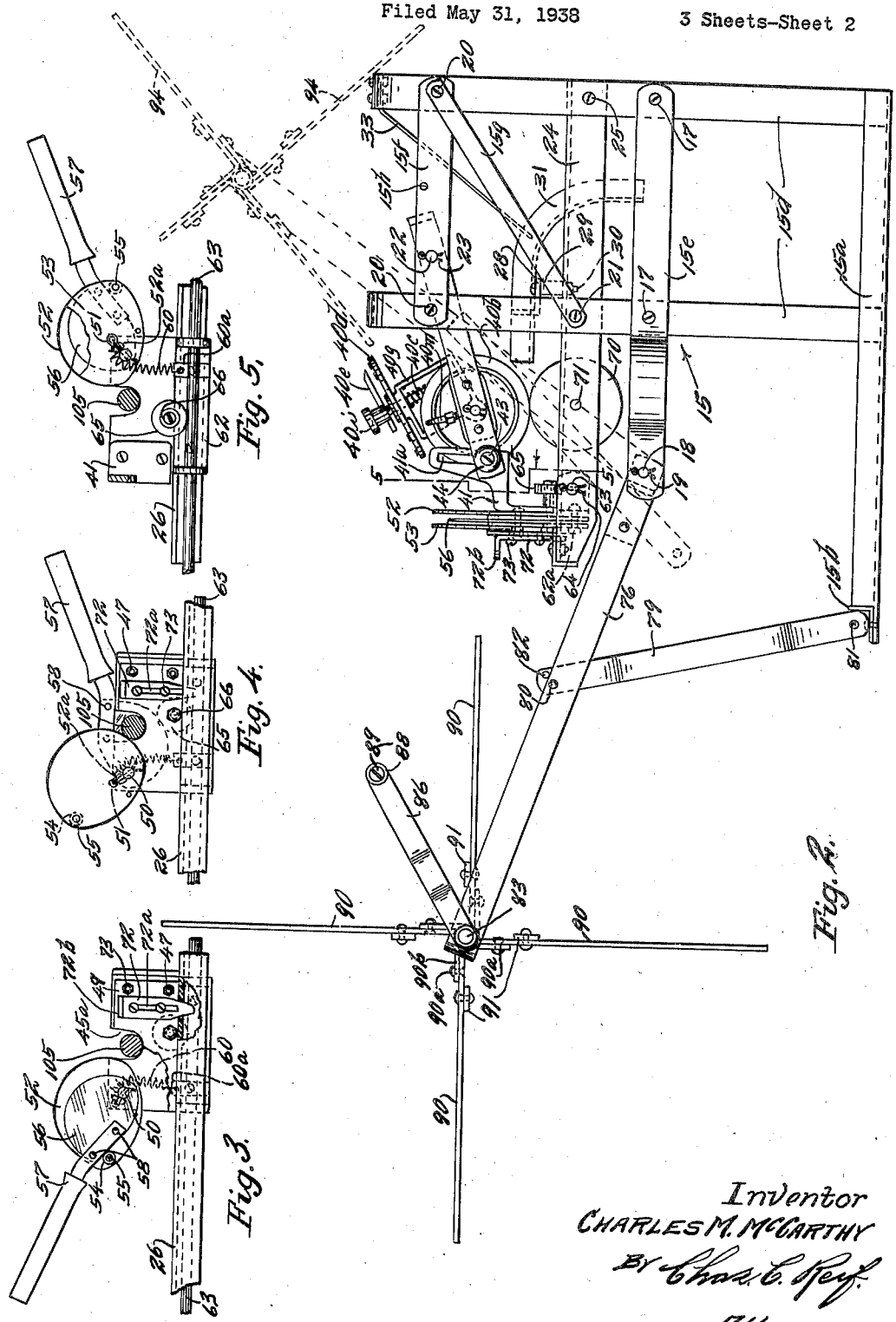
Inventor
CHARLES M. McCARTHY
By Chas. E. Reyf.
Attorney.

April 15, 1941.  C. M. McCARTHY  2,238,067
ROPE WINDING AND MEASURING MACHINE
Filed May 31, 1938  3 Sheets-Sheet 3
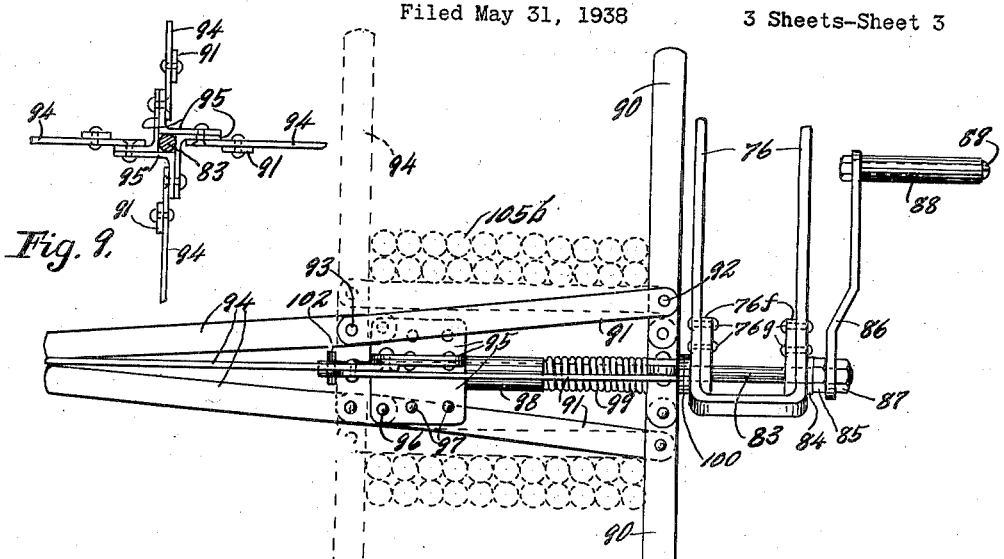
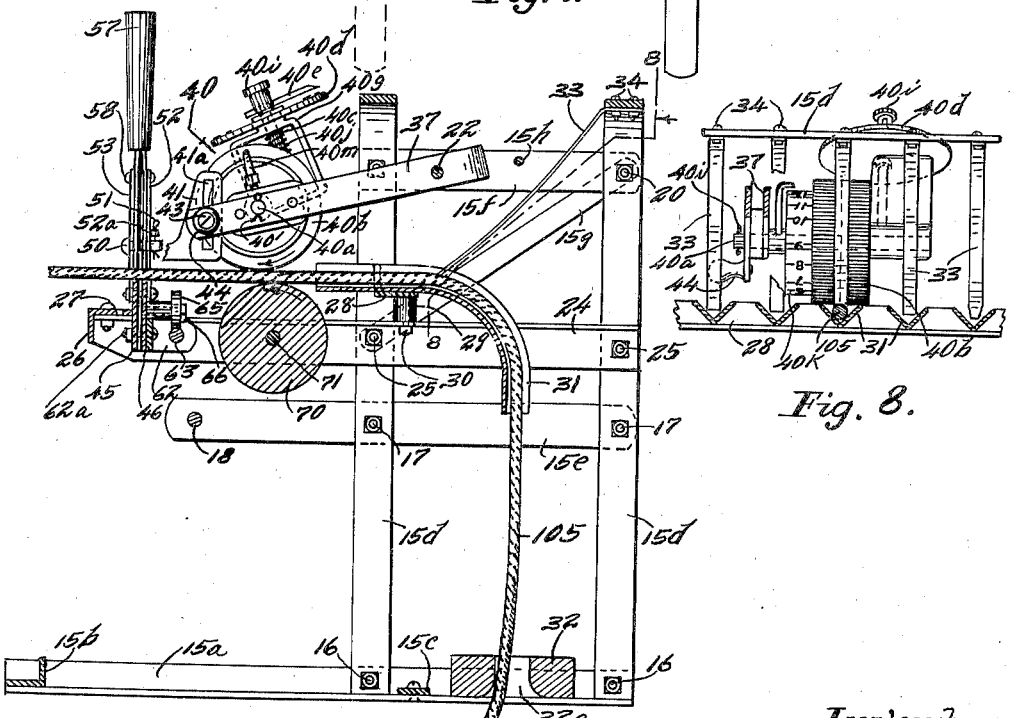
Inventor
CHARLES M. McCARTHY
By Chas. C. Reif
Attorney Patented Apr. 15, 1941

2,238,067

UNITED STATES PATENT OFFICE 2,238,067

ROPE WINDING AND MEASURING MACHINE

Charles M. McCarthy, Minneapolis, Minn.

Application May 31, 1938, Serial No. 210,907

7 Claims. (Cl. 33—130)

This invention relates to a rope handling machine or to a machine for winding, measuring and cutting rope whereby the rope may be conveniently dispensed. Rope is furnished in large coils and it is rather cumbersome and inconvenient to take rope from the coil and measure it merely with hand implements. While rope handling machines have heretofore been proposed, a problem has been encountered in measuring the rope in that the rope, due to its helical or twisted formation has a tendency to creep under or through any measuring apparatus. The form of the rope gives it a tendency to rotate and to progress as a screw so that more rope has passed the measuring device than the same indicates.

It is an object of this invention to provide a simple, efficient and accurate rope winding and measuring machine.

It is a further object of the invention to provide a rope handling machine constructed and arranged to handle quite a number of ropes of different sizes and having a measuring means adapted to be positioned to correctly measure the rope being handled.

It is another object of the invention to provide a machine such as set forth in the preceding paragraph, the same having means for winding and drawing the rope past the measuring device and also preferably having a simple and efficient means for severing the rope.

It is also an object of the invention to provide a rope winding and measuring machine comprising a plurality of rope guiding members, each constructed and arranged to prevent rotation and thus creeping of the rope.

It is still another object of the invention to provide a rope handling machine comprising a rope guiding member which is of arcuate form with its rope engaging surface convex, said member having sides disposed at an angle to each other so that as the rope is drawn therethrough it will exert pressure on said sides.

It is still further an object of the invention to provide a rope winding and measuring machine having a plurality of spaced rope guides, a reel for winding up a rope movable into operative relation to any one of said guides, a measuring device which is movable into operative position relative to any one of said guides and preferably a cutting mechanism which is also movable into operative position relative to any one of said guides.

These and other objects and advantages of the invention will be fully set forth in the following description made in connection with the accompanying drawings in which like reference characters refer to similar parts throughout the several views and in which—

Fig. 2 is a view in side elevation of said device as seen from the right of Fig. 1;

Fig. 3 is a partial view in front elevation substantially as seen from line 3—3 of Fig. 1 looking in the direction of the arrows;

Fig. 4 is a view similar to Fig. 3 showing some of the parts in different positions;

Fig. 5 is a vertical section taken on line 5—5 of Fig. 2 as indicated by the arrow;

Fig. 6 is a vertical section taken substantially on line 6—6 of Fig. 1 as indicated by the arrow;

Fig. 7 is a view in side elevation of a reel used showing the same in discharging position, the winding position and rope being shown in dotted lines;

Fig. 8 is a vertical section taken on line 8—8 of Fig. 6; and

Fig. 9 is a vertical section taken on line 9—9 of Fig. 1 as indicated by the arrows.

Figure 1:
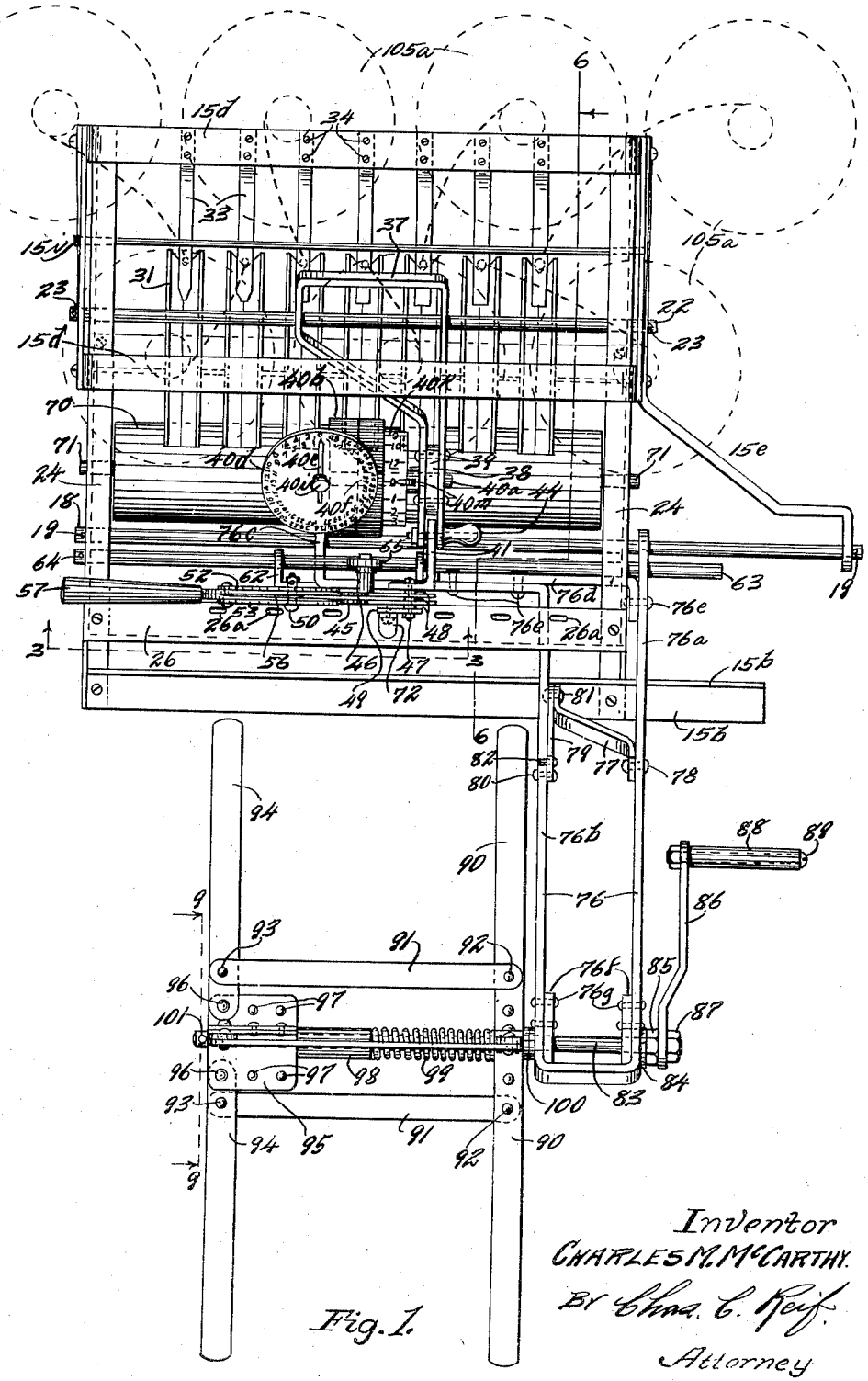
Fig. 1 is a top plan view of a machine, certain parts being shown in dotted lines.

Referring to the drawings a machine is shown comprising a frame designated generally as 15 and comprising spaced horizontal base members 15a illustrated as of angular form, said members being connected at their front ends by a transversely extending member 15b also shown as of angular form having a vertically disposed side and having its horizontal side connected to the horizontal flanges of members 15a. Member 15b extends to one side of one member 15a as shown in Fig. 1. Members 15a are also connected by a transversely extending member 15c shown as a flat bar. Spaced members 15d have vertical portions secured to members 15a by headed and nutted bolts 16, the same resting on the horizontal flanges of members 15a and engaging the inner side of the vertical flanges of said members. Members 15d each have top horizontal portions extending between the vertical portions thereof, said members thus being substantially U-shaped. Bars 15e extend horizontally between members 15d at the outer sides thereof being secured thereto by the bolts 17, one of which bars 15a extends some distance in front of forward member 15d. A rod 18 illustrated as of cylindrical form extends through and between members 15e adjacent their forward ends, the same being secured against longitudinal movement by the split keys 19 extending therethrough at the outer sides of bars 15e. Bars 15f extend horizontally between members 15d being secured thereto by the bolts 20 and diagonal brace members 15g extend from the rear ends of members 15f downwardly and forwardly to the forward members 15d to which they are secured by bolts 21. Members 15g are secured at their upper and rear ends by the bolts 20. A brace rod 15h extends between members 15f adjacent the top and centers thereof, the same being held against longitudinal movement in any suitable manner as by having pins or split keys 15i extending therethrough at the outer sides of members 15f. A rod 22 extends through and between bars 15f some distance in the rear of forward member 15d, the same being held against longitudinal movement by the split keys 23. Angle members 24 extend between the vertical portions of members 15d some distance above members 15e, the same having their vertical flanges engaging the inner sides of members 15d and secured thereto by the bolts 25 and 21. Angle members 24 have horizontal flanges extending inwardly from the members 15d and said members 24 extend forwardly quite a distance beyond the forward member 15d. An angle member 26 extends transversely between members 24 at their forward ends having its horizontal flange extending downwardly at the forward ends of members 24, angle member 26 being secured to the members 24 by the bolts 27. An angle member 28 extends transversely between the vertical portions of forward member 15d, the same having a horizontal flange disposed upon spacing thimbles 29 and being secured to bars 24 by bolts 30 passing therethrough, through thimbles 29 and bars 24. The vertical flange of angle member 28 has V-shaped notches cut therein in which are disposed the horizontal portions of guide members 31. Guide members 31 are illustrated as angle members and while these angle members might be of various forms, in the embodiment of the invention illustrated they are shown as having their sides disposed substantially at right angles. Members 31 curve downwardly through substantially a right angle so that their rear ends are disposed substantially vertically and the same have their rope-engaging or trough shaped surfaces convex. Members 31 are rigidly secured to angle member 28 in any suitable manner as by welding. A bar 32 which may be made of any suitable material but which in practice has been made of wood, extends between base members 15a and the same is provided with a plurality of holes 32a, each in alignment with the vertical portion of one of the guide members 31. The lower sides of the holes 32 are shown as curved or rounded. A plurality of strips 33 have their upper portions disposed beneath the horizontal portion of rear member 15d and secured thereto by the bolts 34. Strips 33 which preferably are made of somewhat resilient material extend downwardly and forwardly so as to have their lower ends disposed in the members 31 respectively.

A frame 37 is provided illustrated as formed of a flat bar having a portion extending parallel to rod 22 and side portions bent at right angles thereto through which rod 22 passes. One of said side portions is bent at an angle toward and then extends parallel to the other and a circular plate or washer 38 (Fig. 1) is secured between said side portions by the spaced rivets 39. A measuring device designated generally as 40 is carried in frame 37 and has a shaft 40a extending through said frame and washer 38, said shaft being held against longitudinal movement by the split key 40'. Said device comprises a roller 40b having a knurled surface, the same being mounted on shaft 40a and being connected by a suitable reduction gear as a worm and worm gear (not shown) to a shaft 40c extending through a dial plate 40d and having secured thereto a pointer 40e. Pointer 40e cooperates with numerals 40f arranged in two circular rows on plate 40d and which indicate feet. Plate 40d is mounted upon a small frame 40g carried on shaft 40a, a washer 40h overlying said plate and engaged by an enlarged portion of shaft 40c. A knob 40i is secured to the upper end of shaft 40c and said shaft may be lifted against the tension of a spring 40j surrounding the same to disconnect the shaft from the measuring mechanism so that pointer 40e may be set back to zero. A roller 40b has an extension 40k at one side of reduced diameter having numerals and graduations circumferentially spaced thereon which indicate inches. A pointer 40m cooperates with said numerals. A bracket 41 has a portion disposed between the forward ends of frame 37. A bolt 43 passes through a handle 44 and through the ends of frame 37 and bracket 41. Bracket 41 is of angular formation having a front substantially vertical flange and is secured to a pair of spaced plates 45 and 46 by means of bolts 47 upon which are suitable washers 48. Said washers are disposed between said bracket and plates and the outer one is disposed between plate 46 and an outer plate 49 also secured by bolts 47. Plates 45 and 46 have recesses 45a (Fig. 3) cut in their top sides through which a rope being measured is adapted to pass. A headed pin 50 extends through plates 45 and 46 adjacent one corner thereof, the same being held from longitudinal movement by a split key 51. Plates 52 and 53 of somewhat elliptical form are mounted on pin 50 to swing thereon as illustrated in Figs. 3 to 5 inclusive. A bushing or thimble 54 is disposed between said plates and secured by a bolt 55 passing through the same and said plates. A knife or cutter 56 is also mounted for swinging movement on pin 50, the same having a handle 57 secured thereto by rivets 58. Split key 51 passes through a small raised lug 52a on the outer side of plate 52 and the upper end of a coiled tensile spring 60 is secured to key 51, said spring extending around pin 50 and having its other end secured to a small plate 60a secured to bracket 62. Plates 52 and 53 have secured thereto by bolts 62a a bracket 62, the same having rearwardly extending lugs at its ends through which passes a rod 63 extending between the angle members 24 and being held from longitudinal movement by split keys 64. A roller 65 is carried on a stud 66 threaded into bracket 62, said roller engaging the top of and being adapted to roll on rod 63.

A roller 70 has trunnions 71 journaled in the vertical flanges of angle members 24. Bolt 43 is vertically movable by handle 44 in a vertical slot 41a in bracket 41 so as to lift roller 40b off of roller 70. When this is done bracket 41 and the attached parts swing forwardly on rod 63. Angle member 26 has a series of somewhat elongated slots 26a spaced longitudinally thereof and a latch member 72 is disposed at the outer side of plate 47 and slidably mounted thereon by having screws 73 extending through a vertical slot 72a therein. Latch 72 has an outturned upper end 72b forming a handle. Latch 72 may be raised and lowered into position with its lower end entering any one of the slots 26a. When latch 72 is engaged in a slot 26a roller 40b and recesses 45a are aligned with one of the guide members 31.

It will be noted as shown in Fig. 1, that one member 15e extends outwardly from the adjacent angle member 24 and has its outer end extending forwardly to receive the outer end of rod 18. A frame 76 is provided formed of a bar bent into substantially U-shape so as to have parallel sides, one side 76a of which is apertured to have rod 18 pass therethrough. The other side 76b is bent at a right angle away from side 76a adjacent rod 18 and is again bent at a right angle to have a terminal portion 76c which is also apertured to have rod 18 pass therethrough. A reinforcing bar 76d is connected to sides 76a and 76b by the rivets 76e. A rest or supporting member 77 is pivotally secured at its upper end to side 76a by rivets 78. Another member 79 shown as a flat bar is pivoted at its upper end to side 76b by the rivets 80 and is connected at its lower end to the lower end of member 77 by rivets 81. A pin 82 extends through and projects from the upper end of member 79, the same being adapted to engage the top side of side member 76b. The frame member 76 has reinforcing plates 76f adjacent its bight portion secured thereto by rivets 76g and a shaft 83 extends through said plates and sides 76a and 76b and is journaled therein. A washer 84 surrounds said shaft at the outer side of side 76a and is engaged by a nut 85. A crank arm 86 has one end apertured to receive shaft 83 and engages nut 85, the same being held in position by another nut 87 threaded on shaft 83 at the outer side of handle arm 86. A handle 88 is secured to the other end of arm 86 by a bolt 89 which passes therethrough and through said arm. A reel is secured to shaft 83 having an end frame comprising circumferentially spaced members 90 illustrated as made of flat bars, members 90 extending outwardly substantially 90 degrees apart. Members 90 have secured thereto at their inner ends by rivets 90a short plates 90b, the inner ends of which substantially surround shaft 86 and are secured thereto. An inner frame or core for said reel is formed by circumferentially spaced members 91 also shown as flat bars, the same having their ends pivotally connected to bars 90 by the rivets 92. Bars 91 extend substantially at right angles to bars 90 and are pivoted at their other ends by rivets 93 to circumferentially spaced bars 94 which are also disposed substantially 90 degrees apart, the same extending outwardly the same distance from shaft 86 as the bars 90. Bars 94 are pivotally connected at their inner ends by rivets 96 to a frame formed by plates 95 of angular formation and arranged in equally spaced circumferential relation about shaft 83 as shown in Fig. 9. Plates 95 extend inwardly between bars 91 for some distance and are connected together by additional rivets 97. A sleeve 98 engages the inner ends of plates 95, the same being slidable on shaft 83 and engaged at its other end by a coiled compression spring 99 also surrounding shaft 83 and bearing at its other end against the bars 90 forming the inner end frame of said reel. Washers 100 are disposed on shaft 83 between side members 76b and said inner end frame. Shaft 83 extends somewhat beyond plates 95 and has a pin 101 extending therethrough holding plates 95 thereon.

In operation, the rope 105 to be handled will be disposed in convenient relation to the machine. One common arrangement is to have the machine on a platform or floor beneath which the coils 105a of the rope are arranged. The rope in the different coils will be of different diameters. A strand from each coil 105 is led upwardly through the apertures 32a and over one of the guides 31 and under members 33 which form stop pawls. When a length of rope is to be dispensed the operator will lift latch 72 and lift up handle 44, thus swinging frame 37 on rod 22 and lifting the measuring device including roller 40b. The measuring device and the cutting mechanism can now be moved transversely of the frame of the machine, frame 37 sliding on rod 22 and the cutting mechanism sliding on rod 63 with roller 65 rolling on said rod 63. Said parts are moved so as to be brought into operative position or into alignment with the guide member 31 in which the rope to be dispensed is disposed. When the measuring device and cutting mechanism are so positioned latch 72 is allowed to drop into the corresponding slot 26a and the measuring device and cutting mechanism are thus held in position. The operator now lifts handle 44 and thus roller 40b and the rope is drawn out beneath roller 40b over roller 70 and through the recess 45a. The end of the rope is passed around the members 91 and fastened in any suitable manner. Before the rope is moved under roller 40b knob 40i is lifted and the pointer 40e is turned to the zero numeral 40f. Roller 40k is also rotated so that the zero designation is opposite pointer 40m. Roller 40 is then allowed to rest on the rope, the rope being supported on roller 70 and as the rope moves outward said rollers are rotated as indicated by the arrows in Fig. 6. The reel is slidable on rod 18 and the reel is moved so as to be centrally disposed with relation to the guide member 31 through which the rope is passing. When the rope has been secured to the reel said reel is rotated by means of handle 88 and the rope is drawn outwardly and wound on the reel, the same sliding through the arcuate guide member 31 and under roller 40b continuously rotating the latter so that the rope is accurately measured. When the measuring device indicates the desired amount of rope, the operator takes hold of the handle 57 and swings knife 56 in a clockwise direction so that the knife moves to the position shown in Fig. 4 and the rope is severed at an exact right angle to its length. A very clean cut is made and this is quite important. If the cut is not clean and at a right angle to the length of the rope throughout its diameter the rope will tend to untwist so that a ragged end is formed. The coil of rope wound on the reel as indicated in dotted lines in Fig. 7, is now preferably tied by suitable cords. The operator now takes hold of the outer ends of bars 94 and swings the same outwardly. The bars swing about pivots 93 and act as levers moving plates 95 and sleeve 98 inwardly against the tension of spring 99. This not only swings the bars 94 to outwardly converging relation as shown in Fig. 7 but also swings bars 91 about pivots 92 so that bars 91 extend toward the free end of the reel in converging relation. As shown in Fig. 7, bars 94 and 91 come substantially into alignment. Bars 91 and 94 thus form an outwardly tapering frame. This completely releases the coil of rope 105b and the same being quite free on the reel can now be slid off without any binding. Heretofore it has been quite a difficult task to get a wound coil of rope off of the core of the reel. It has been a common practice in some places to use a heavy sledge hammer to drive off the coil of rope. It will be noted that the reel can be swung about rod 18 and disposed over the machine as indicated in dotted lines in Fig. 2 when the machine is not being used. It will also be seen that members 77 and 79 support the reel in operative position by having their lower ends seated in angle 15b. The reel is thus firmly supported so as to be quite steady in operation. Heretofore difficulty has been experienced in measuring a rope due to the fact that the rope would creep under the measuring wheel or roller. The rope being formed of twisted strands is of helical formation and the strands in effect form threads so that the rope simulates a threaded screw. The rope tends to rotate and move as a screw and if it does this it progresses under the measuring roller without being properly measured. Applicant has solved this problem by providing the guide members 31 which are of angular formation so that the sides thereof extend at an angle to each other. These sides form a trough and when the rope is drawn through the guide the rope presses against the sides which are at an angle to each other and any rotation of the rope is prevented. The effect is just the same as if the rope is grasped by a strong pair of fingers and held from rotation. The knife 56 is very effectively guarded by plates 52 and 53. When the knife is swung toward the rope spring 60 moves the plates 52 and 53 until they engage the rope as shown in Fig. 4 so that there is practically no chance for the operator to get his fingers under the knife. The knife is thus at all times disposed betwen the guard plates 52 and 53 except when the knife actually passes through the rope. The knife passes very close to plates 45 and 46 which are disposed at either side thereof so that there can be no fraying of the rope. As the rope is drawn through the guides 31 and after it is cut any backward movement of the rope is prevented by the pawls 33.

From the above description it will be seen that I have provided a very simple and yet highly efficient rope winding and measuring machine. The rope can be very conveniently handled and wound into a coil and the rope is very accurately measured. Many tests have been made on the measuring feature and it has always been found that the machine is unerringly correct. The rope is conveniently cut and it can be very quickly and conveniently discharged from the reel which has the collapsing core frame feature. The machine is of convenient size, quite compact and easily operated. The same has been amply demonstrated in actual practice, found to be very successful and efficient and is being commercially made.

It will, of course, be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A rope winding and measuring machine having in combination, a frame, a series of spaced rope guides on said frame over which ropes of different diameters may be drawn, a reel mounted on said frame for winding a rope and drawing it over any one of said guides, said reel being movable into alignment with any one of said guides, a roller extending across said frame in front of said guides and a measuring device having a roller adapted to contact a rope moving over and supported on said first mentioned roller, said device being mounted on said frame and movable transversely of said frame into alignment with any one of said guides.

2. In a rope handling machine, a guiding and holding means comprising a member of curved form over which a rope of helical formation may be drawn, said member being V-shaped in cross section and having sides extending at an angle to each other adapted to be engaged by said rope whereby creeping of said rope due to its helical formation is prevented and means for drawing a rope through the trough portion of said member in frictional engagement therewith.

3. In a rope handling machine, a rope guiding and holding member having sides disposed at an angle to each other, the bisecting plane of said angle being substantially vertical, said member being convexly curved on its rope engaging side so that when a rope is pulled therethrough the rope presses against said sides and any rotation of said rope is prevented and means for drawing said rope through said member.

4. In a rope handling machine a rope guiding member having a vertical receiving portion, the same being curved through substantially 90 degrees so as to have a substantially horizontal delivery portion, the rope engaging surface being longitudinally convex and said member being of V-shape in cross section whereby when a rope is pulled through said member said rope presses against the sides thereof and creeping of said rope is prevented and means for pulling a rope through said member in engagement with said convex portion.

5. A rope handling machine having in combination, a frame, a series of trough-like guides mounted on said frame and spaced transversely thereof having substantially vertical receiving portions and substantially horizontal delivery portions, a roller on said frame extending across said delivery ends over which a rope leaving any one of said guides moves, a measuring device movable on said frame into alignment with any one of said guides and having a roller above said first mentioned roller for engagement and operation by a rope moving over said first mentioned roller.

6. A rope handling machine having in combination, a frame, a series of spaced rope guides mounted on said frame, means carried on said frame and movable into alignment with any one of said guides for engaging and measuring a rope as it is drawn through said guide, a plate movable into alinement with any one of said guides having a groove therein through which said rope may pass, a cutter pivoted at one side of said groove and means for swinging said cutter across said groove to cut the rope therein.

7. The structure set forth in claim 1, a guide means extending transversely of said frame in front of said measuring device and said guides and a cutting mechanism movable on said guide means so that it may be brought into alinement with any one of said guides for severing a rope drawn over one of said guides and past said measuring device.

CHARLES M. McCARTHY.